Aug. 5, 1952 P. R. J. COURT 2,606,305

TELEVISION SCANNING CIRCUITS

Filed Sept. 19, 1950

Inventor

Patrick Richard James Court

By

O'Boyle + Blair Attorneys

Patented Aug. 5, 1952 2,606,305

UNITED STATES PATENT OFFICE 2,606,305

TELEVISION SCANNING CIRCUITS

Patrick R. J. Court, Cambridge, England, assignor to Pye Limited, Cambridge, England, a British company Application September 19, 1950, Serial No. 185,630
In Great Britain September 27, 1949

11 Claims. (Cl. 315—27)

The present invention relates to scanning circuits for television receivers having electromagnetic deflection, and more particularly to line scanning circuits.

In television receivers, the line deflecting coils are generally transformer-coupled to the output stage of the time base. In order to reduce ringing at the commencement of each scanning pulse, it is usual to connect a diode and series resistance across the deflector coil circuit.

According to the present invention, a series inductance is connected in one of the leads from the transformer to the deflector coils and is shunted by a series resistance and capacity, the diode being connected between an intermediate point on the inductance and the other lead from the transformer to the deflecting coils. Preferably two or more diodes are connected across the circuit from different points on the inductance.

Three embodiments according to the invention are shown in the accompanying drawings.

Figure 1:
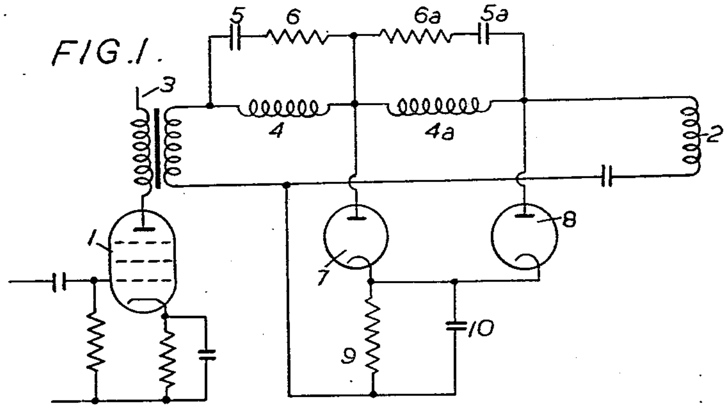

Referring to Figure 1, the output valve 1 of the time base is connected to the line deflector coils 2 through a transformer 3. According to the invention a series inductance, or two series inductances 4, 4*a*, are connected in the circuit and shunted respectively by series condensers and resistances 5, 6, 5*a*, 6*a*. To the intermediate point between the inductances 4, 4*a* is connected a diode 7, a second diode 8 being connected to that end of the inductance 4*a* adjacent the deflecting coils. The cathodes of the two diodes are connected through a resistance 9 and condenser 10 to the other lead between the secondary of the transformer 3 and the deflector coils 2.

By means of the arrangement described, improved linearisation of the line scan is obtained. Any of the elements 4, 5 or 6 may be made adjustable for obtaining accurate linearisation.

Figure 2:
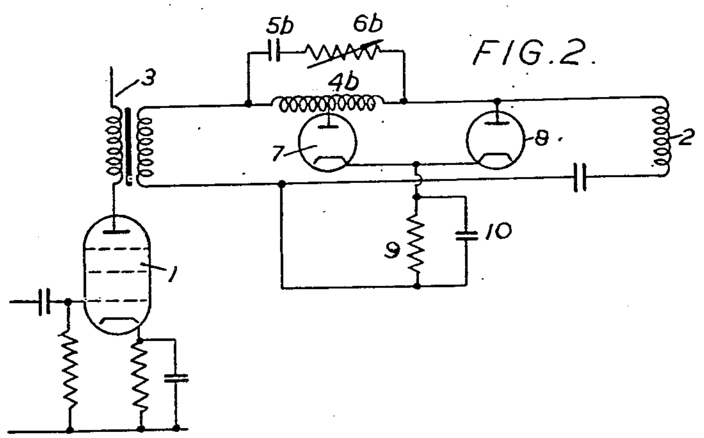

Figure 2 shows a modification in which the two inductances are combined in a single tapped inductance 4*b*, the entire inductances being shunted by a condenser 5*b* and resistance 6*b* connected in series. The resistance 6*b* is preferably made adjustable for obtaining the desired linearisation.

Figure 3:
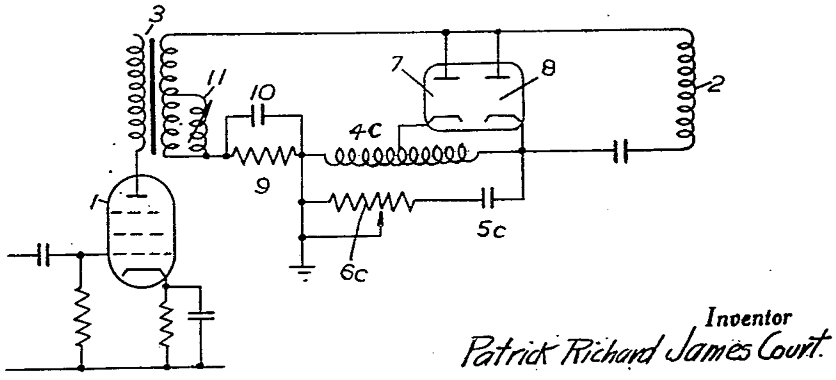

Figure 3 shows a further modified circuit in which all the inductances and resistances are connected on the low potential side of the deflection circuit. As will be seen from this figure the resistance 9 and condenser 10 in the cathode lead are connected in the deflector circuit in series with the inductance 4*c*, the diodes 7 and 8, which may comprise a double diode, having their cathodes connected respectively to a tapping point on the inductance 4*c* and to the end of the inductance which is adjacent the deflection coils. The two anodes are connected to the other lead between the transformer and the deflecting coils. The condenser 5*c* and resistance 6*c* shunting the inductance 4*c* are so connected that the end of the resistance 6*c* is connected to earth, and the tapping point on this resistance is also connected to earth. By adjusting the resistance 6*c* the shape of the initial portion of the scanning pulses can be adjusted as desired.

The scanning amplitude may be adjusted by means of a series inductance; but preferably by a variable inductance 11 shunting part of the secondary winding of the transformer 3. This arrangement avoids losses in the extra high tension supply as occurs when the scanning amplitude is adjusted by a series inductance.

Even if the second diode 8 is omitted, for example from the arrangement shown in Figure 3, improved linearisation is obtained over conventional circuits.

I claim:

1. In a cathode ray tube television receiver having electromagnetic deflecting means, a scanning output transformer having a primary winding and a secondary winding, a source of deflecting signals connected to said primary winding at least one inductance connected in series between one end of said secondary winding and one end of said deflecting means, a resistor joined in series with a condenser and connected in shunt across said inductance, an electronic rectifier having one electrode connected to an intermediate point on said inductance and the other electrode connected to a lead connecting the other end of the said secondary winding to the other end of said deflecting means.

2. In a cathode ray tube television receiver having electromagnetic deflecting means, a scanning output transformer having a primary winding and a secondary winding, a source of deflecting signals connected to said primary winding at least one inductance connected in series between one end of said secondary winding and one end of said deflecting means, a variable resistor joined in series with a condenser and connected in shunt across said inductance, a diode having an anode and a cathode, said anode being connected to an intermediate point on said inductance and said cathode being connected to one end of a resistor shunted by a condenser, the other end of said resistor being connected to a lead connecting the other end of the said secondary winding to the other end of said deflecting means.

3. In a cathode ray tube television receiver having electromagnetic deflecting means, a scanning output transformer having a primary winding and a secondary winding, a source of deflecting signals connected to said primary winding, two inductances joined in series and connected between one end of said secondary winding and one end of said deflecting means a resistor joined in series with a condenser, connected in shunt across each of said inductances, a first electronic rectifier having one electrode connected to the junction between the two inductances, a second electronic rectifier having one electrode connected to the end of that inductance which is joined to said deflecting means, the second electrode of said first rectifier being connected to the second electrode of said second rectifier and to a lead connecting the other end of said secondary winding to the other end of said deflecting means.

4. In a cathode ray tube television receiver having electromagnetic deflecting means, a scanning output transformer having a primary winding and a secondary winding a source of deflecting signals connected to said primary winding, two inductances joined in series and connected between one end of said secondary winding and one end of said deflecting means a resistor joined in series with a condenser, connected in shunt across each of said inductances, a first diode having an anode and a cathode, said anode being connected to the junction between the two inductances, a second diode having an anode and a cathode, said anode being connected to the end of that inductance which is joined to said deflecting means, the cathode of said first diode being connected to the cathode of said second diode and to one end of a resistor shunted by a condenser, the other end of said resistor being connected to a lead connecting the other end of said secondary winding to the other end of said deflecting means.

5. In a cathode ray tube television receiver having electromagnetic deflecting means, a scanning output transformer having a primary winding and a secondary winding a source of deflecting signals connected to said primary winding, two inductances joined in series and connected between one end of said secondary winding and one end of said deflecting means a resistor joined in series with a condenser, connected in shunt across each of said inductances, at least one of said resistors and condensers being variable a first diode having an anode and a cathode said anode being connected to the junction between the two inductances, a second diode having an anode and a cathode said anode being connected to the end of that inductance which is joined to said deflecting means, the cathode of said first diode being connected to the cathode of said second diode and to one end of a resistor shunted by a condenser, the other end of said resistor being connected to a lead connecting the other end of said secondary winding to the other end of said deflecting means.

6. In a cathode ray tube television receiver having electromagnetic deflecting means a scanning output transformer having a primary winding and a secondary winding, a source of deflecting signals connected to said primary winding, an inductance connected in series between one end of said secondary winding and one end of said deflecting means, a resistor joined in series with a condenser and connected in shunt across said inductance, a first diode having one electrode connected to an intermediate point on said inductance, a second diode having one electrode connected to the end of said inductance adjacent the deflecting means, the second electrode of the first diode being connected to the second electrode of said second diode and to a lead connecting the other end of said secondary winding to said deflecting means.

7. In a cathode ray tube television receiver having electromagnetic deflecting means a scanning output transformer having a primary winding and a secondary winding, a source of deflecting signals connected to said primary winding, an inductance connected in series between one end of said secondary winding and one end of said deflecting means, a variable resistor joined in series with a condenser and connected in shunt across said inductance, a first diode having an anode and a cathode, said anode being connected to an intermediate point on said inductance, a second diode having an anode and a cathode said anode being connected to the end of said inductance adjacent the deflecting means the cathode of the first diode being connected to the cathode of said second diode and to one end of a resistor shunted by a condenser, the other end of said resistor being connected to a lead connecting the other end of said secondary winding to said deflecting means.

8. In a cathode ray tube television receiver having electromagnetic deflecting means, a scanning output transformer having a primary winding and a secondary winding, a source of deflecting signals connected to said primary winding, an inductance having one end joined in series with a resistor shunted by a condenser to one end of said secondary winding and the other end connected to one end of said deflecting means, a resistor in series with a condenser connected in shunt across said inductance, a first diode having one electrode connected to an intermediate point on said inductance a second diode having one electrode connected to that end of said inductance which is connected to said deflecting means, the second electrode of said first diode being connected to the second electrode of said second diode and to a lead connecting the other end of said secondary winding to the other end of said deflecting means.

9. In a cathode ray tube television receiver having electromagnetic deflecting means, a scanning output transformer having a primary winding and a secondary winding, a variable inductance connected in shunt across part of said secondary winding, a source of deflecting signals connected to said primary winding, an inductance having one end joined in series with a resistor shunted by a condenser to one end of said secondary winding and the other end joined through a condenser to one end of said deflecting means, a variable resistor in series with a condenser connected in shunt across said inductance, a first diode having an anode and a cathode, said cathode being connected to an intermediate point on said inductance a second diode having an anode and a cathode, said cathode being connected to that end of said inductance which is connected through said condenser to said deflecting means, the second electrode of said first diode being connected to the second electrode of said second diode and to a lead connecting the other end of said secondary winding to the other end of said deflecting means.

10. In a cathode ray tube television receiver having electromagnetic deflecting means, a scanning output transformer having a primary winding and a secondary winding a source of deflecting signals connected to said primary winding, an inductance having one end joined in series with a resistor shunted by a condenser to the low potential end of said secondary winding and the other end joined through a condenser to one end of said deflecting means a variable resistor joined in series with a condenser connected in shunt across said inductance, the slider of said variable resistor being connected together with the end of the inductance which is joined in series with a resistor shunted by a condenser, to earth potential, a first diode having an anode and a cathode said cathode being connected to an intermediate point on said inductance a second diode having an anode and a cathode said cathode being connected to the end of said inductance which is connected through a condenser to said deflecting means the anode of first diode being connected to the anode of said second diode and to a lead connecting the high potential end of said secondary winding to the other end of said deflecting means.

11. In a cathode ray tube television receiver having electromagnetic deflecting means, a scanning output transformer having a primary winding and a secondary winding, a variable inductance connected in shunt across part of said secondary winding, a source of deflecting signals connected to said primary winding, an inductance having one end joined in series with a resistor shunted by a condenser to the low potential end of said secondary winding and the other end joined through a condenser to one end of said deflecting means a variable resistor joined in series with a condenser connected in shunt across said inductance, the slider of said variable resistor being connected together with the end of the inductance which is joined in series with a resistor shunted by a condenser, to earth potential, a first diode having an anode and a cathode said cathode being connected to an intermediate point on said inductance a second diode having an anode and a cathode said cathode being connected to the end of said inductance which is connected through a condenser to said deflecting means the anode of said first diode being connected to the anode of said second diode and to a lead connecting the high potential end of said secondary winding to the other end of said deflecting means.

PATRICK R. J. COURT.

REFERENCES CITED

The following references are of record in the file of this patent:

UNITED STATES PATENTS

| Number | Name | Date |
|---|---|---|
| 2,466,784 | Schade | Apr. 12, 1949 |
| 2,478,744 | Clark | Aug. 9, 1949 |
| 2,492,090 | Bass | Dec. 20, 1949 |
| 2,510,027 | Torsch | May 30, 1950 |
| 2,512,400 | Wendt | June 20, 1950 |
| 2,513,160 | Friend | June 27, 1950 |
| 2,536,839 | Clark et al. | Jan. 2, 1951 |
| 2,543,305 | Schwarz | Feb. 27, 1051 |
| 2,545,346 | Edelsohn | Mar. 13, 1951 |
| 2,553,360 | Court | May 15, 1951 |
| 2,555,827 | Tourshou et al. | June 5, 1951 |
| 2,555,830 | Barco | June 5, 1951 |